(12) United States Patent
Huang et al.

(10) Patent No.: US 10,365,486 B2
(45) Date of Patent: Jul. 30, 2019

(54) HEAD UP DISPLAY

(71) Applicants: LITE-ON ELECTRONICS (GUANGZHOU) LIMITED, Guangzhou (CN); LITE-ON TECHNOLOGY CORPORATION, Taipei (TW)

(72) Inventors: Chien-Wei Huang, Taipei (TW); Chun-Yu Lee, Taipei (TW); Hui-Ching Tsai, Taipei (TW)

(73) Assignees: LITE-ON ELECTRONICS (GUANGZHOU) LIMITED, Guangzhou (CN); LITE-ON TECHNOLOGY CORPORATION, Taipei (TW)

(*) Notice: Subject to any disclaimer, the term of this patent is extended or adjusted under 35 U.S.C. 154(b) by 102 days.

(21) Appl. No.: 15/680,251

(22) Filed: Aug. 18, 2017

(65) Prior Publication Data

US 2018/0157041 A1 Jun. 7, 2018

(30) Foreign Application Priority Data

Dec. 1, 2016 (CN) .......................... 2016 1 1089789

(51) Int. Cl.
*G02B 27/00* (2006.01)
*G02B 27/01* (2006.01)

(52) U.S. Cl.
CPC ..... *G02B 27/0149* (2013.01); *G02B 27/0006* (2013.01); *G02B 2027/0154* (2013.01);
(Continued)

(58) Field of Classification Search
CPC ........ G02B 27/0149; G02B 2027/0154; G02B 2027/0159
See application file for complete search history.

(56) References Cited

U.S. PATENT DOCUMENTS

| 7,466,220 B2 | 12/2008 | Aoki et al. |
| 2014/0368097 A1 | 12/2014 | Yomogita |
| 2017/0113551 A1 | 4/2017 | Schaellert et al. |

FOREIGN PATENT DOCUMENTS

| DE | 102014212796 A1 | 1/2016 |
| EP | 2955563 A1 | 12/2015 |

(Continued)

OTHER PUBLICATIONS

EPO Search Report dated Apr. 19, 2018 in EP application (No. 17188954.6-1020).
(Continued)

*Primary Examiner* — Priyank J Shah
(74) *Attorney, Agent, or Firm* — McClure, Qualey & Rodack, LLP

(57) ABSTRACT

A head up display (HUD) includes a housing having an opening, a transmission mechanism disposed in the housing, a cover connected to the transmission mechanism and a drive mechanism configured to drive the transmission mechanism. The cover is movable between a closed position wherein the cover hides the opening and an opened position wherein the cover is located within the housing by the transmission mechanism. While the cover moves from the closed position to the opened position, the cover moves to an intermediate position below the opening in a vertical way, and moves away from the intermediate position below the opening to the opened position in sequence.

14 Claims, 10 Drawing Sheets

(52) U.S. Cl.
CPC ............... *G02B 2027/0159* (2013.01); *G02B 2027/0163* (2013.01)

(56) References Cited

FOREIGN PATENT DOCUMENTS

| JP | 2014205376 A | 10/2014 |
| JP | 2014222265 A | 11/2014 |
| JP | 2015710 A | 1/2015 |
| TW | 201636682 A | 10/2016 |

OTHER PUBLICATIONS

EPO Search Report dated Feb. 16, 2018 in EP application (No. 17188954.6-1020).
TIPO Office Action dated Jun. 27, 2017 in Taiwan application (No. 105139690).
JPO Office Action dated Sep. 14, 2018 in JP application (No. 2017166236) with English translation.

HEAD UP DISPLAY

This application claims the benefit of People's Republic of China application Serial No. 201611089789.8, filed Dec. 1, 2016, the subject matter of which is incorporated herein by reference.

BACKGROUND OF THE INVENTION

Field of the Invention

The invention relates in general to a head up display (HUD), and more particularly to a head up display with a cover that can close tightly.

Description of the Related Art

The head up display (HUD) is a device that projects required information in a visual line direction where the driver views the windshield. Thus, the driver can view the required information in the visual line direction when driving without lowering the head.

However, a screen of the conventional HUD is usually exposed. When the time goes by, the screen easily suffers damage due to external environment (such as sunlight and dust). Even though a cover is provided to protect internal elements, most of the covers still cannot close tightly, resulting in the damage of HUD.

Therefore, how to provide a novel HUD to overcome the above problems is one goal for those working in the technical field.

SUMMARY OF THE INVENTION

To resolve the above problems, a HUD is provided according to one embodiment of the present disclosure. The HUD includes a housing having an opening, a transmission mechanism disposed in the housing, a cover connected to the transmission mechanism and a drive mechanism configured to drive the transmission mechanism. The cover is movable between a closed position wherein the cover hides the opening and an opened position wherein the cover is located within the housing by the transmission mechanism. While the cover moves from the closed position to the opened position, the cover moves to an intermediate position below the opening in a vertical way, and moves away from the intermediate position below the opening to the opened position in sequence.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
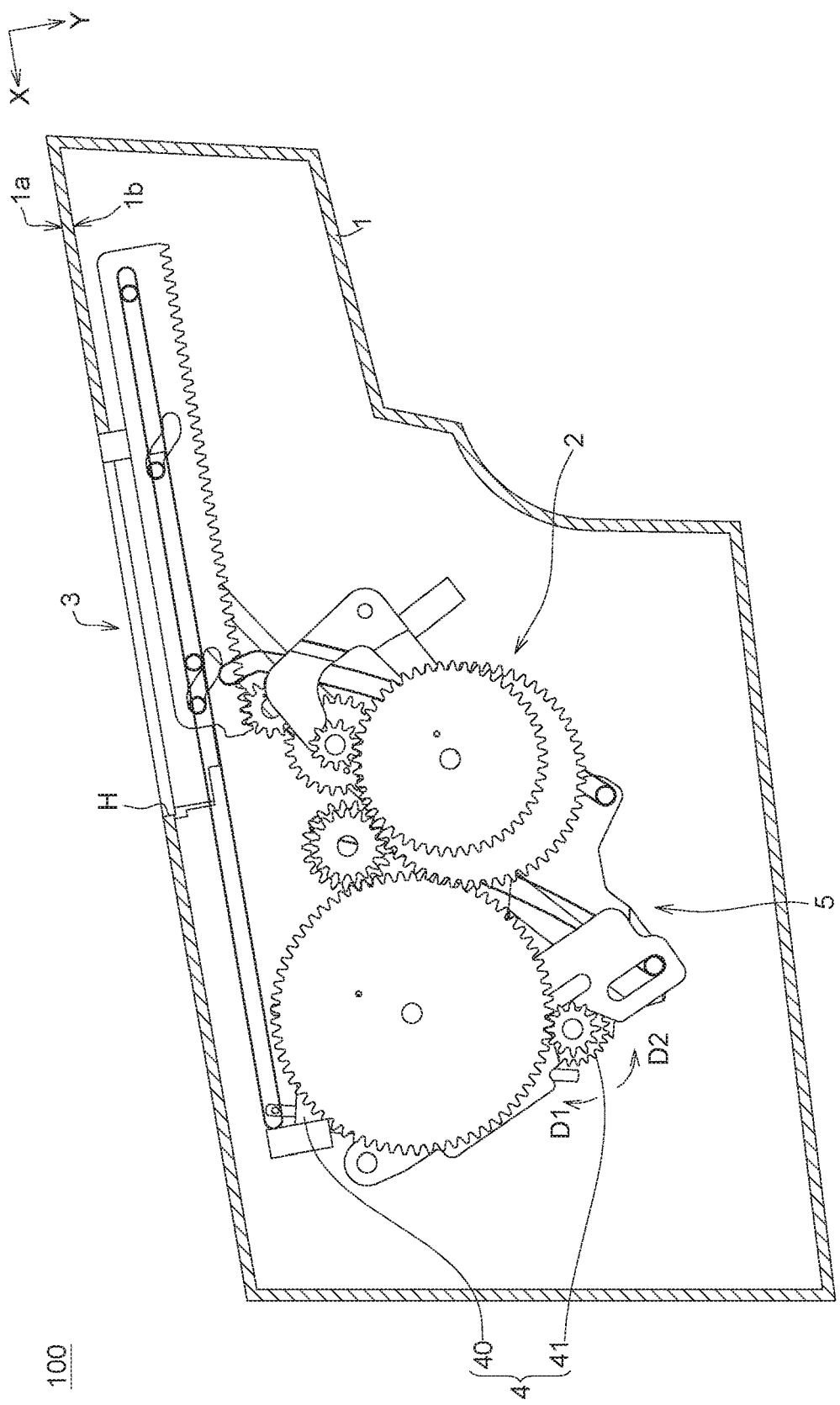
FIG. 1A is a cross-sectional view of a HUD according to an embodiment of the present disclosure.
Figure 1B:
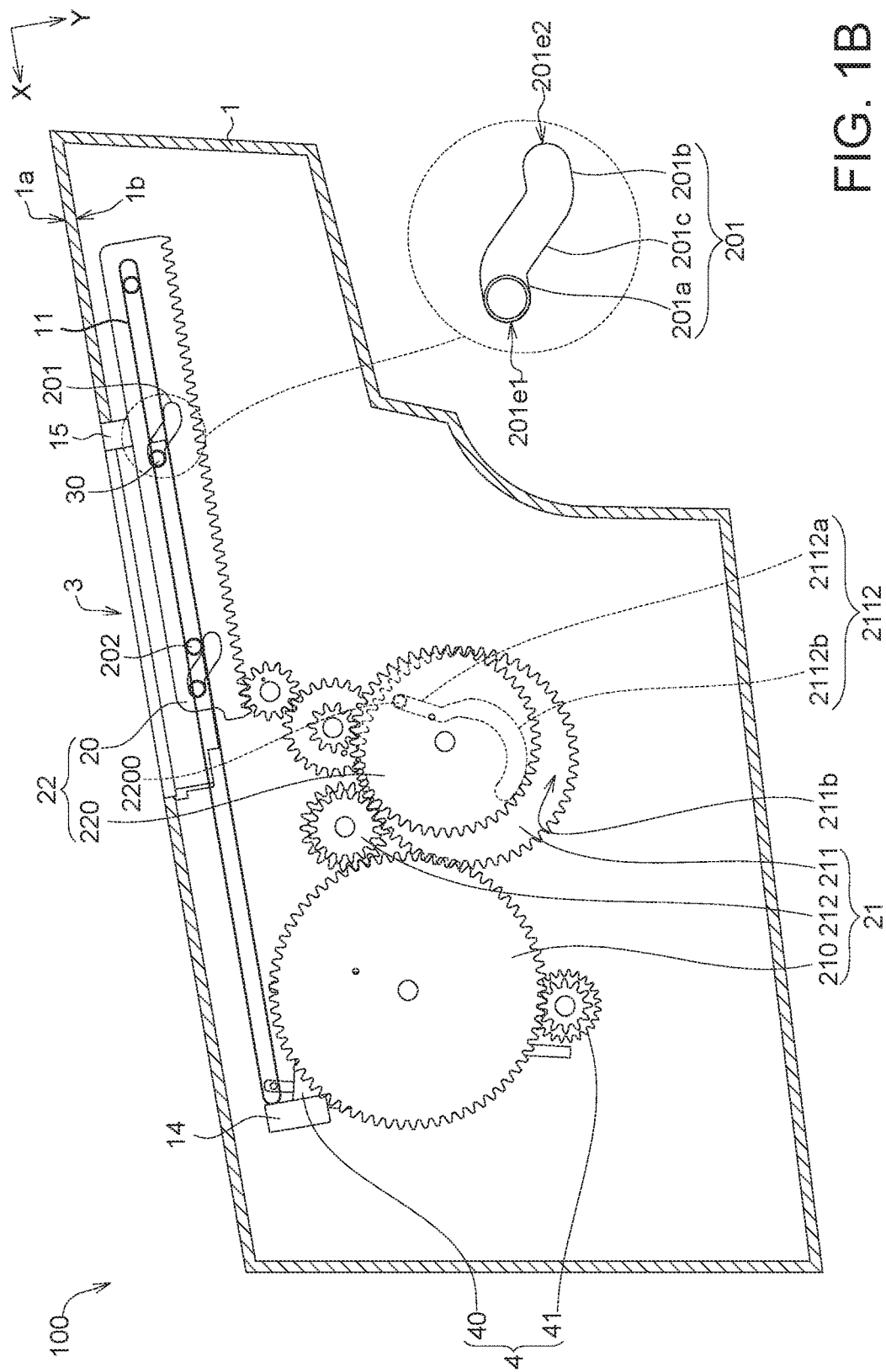
FIG. 1B is a schematic diagram of the HUD showing the connection relation between the cover and the transmission mechanism when the cover of FIG. 1A is located at the closed position.
Figure 1C:
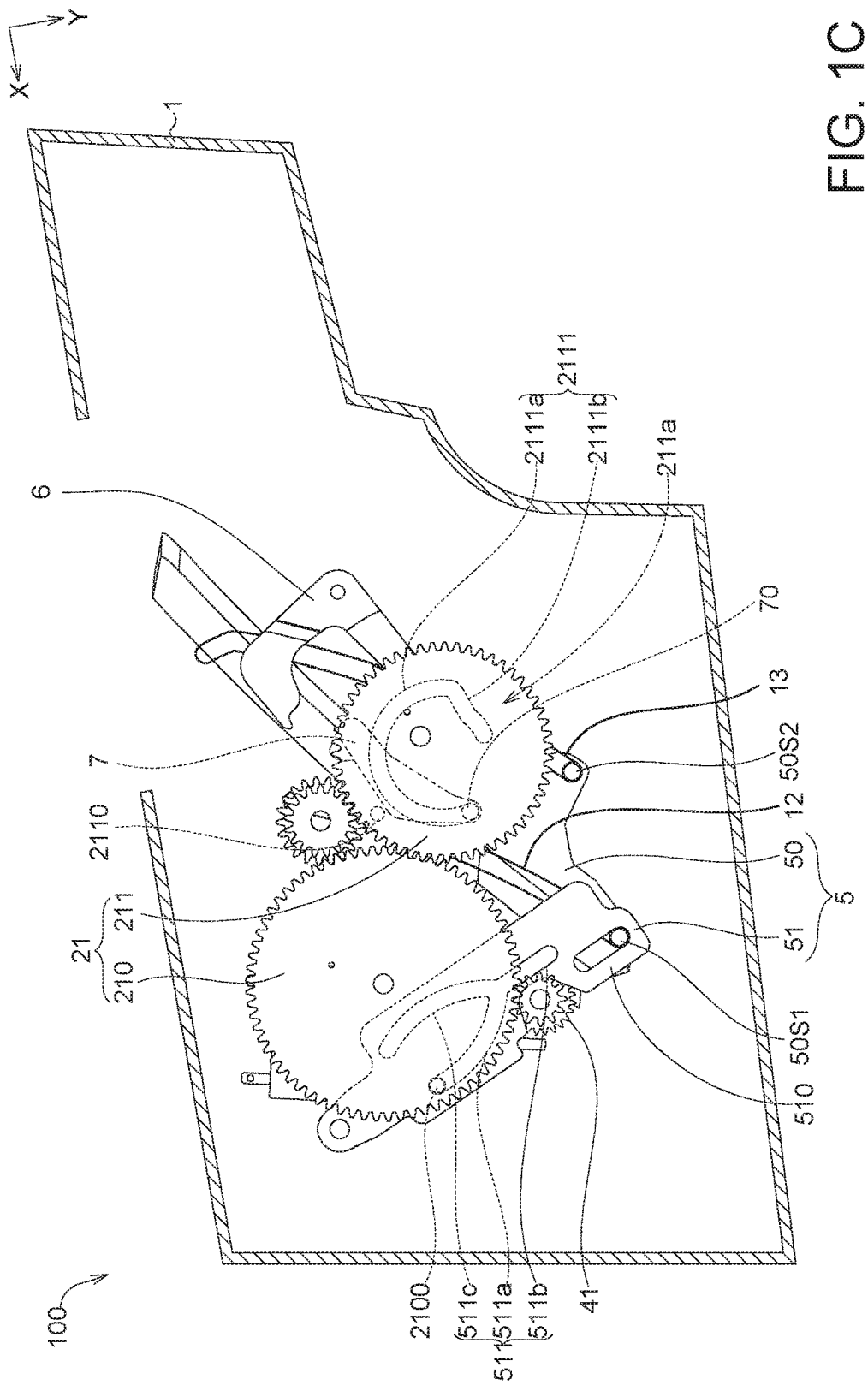
FIG. 1C is a schematic diagram of the HUD showing the connection relation between the screen assembly and the transmission mechanism when the cover of FIG. 1A is located at the closed position.

FIG. 1A is a cross-sectional view of a HUD 100 according to an embodiment of the present disclosure. FIG. 1B is a schematic diagram of the HUD 100 showing the connection relation between the cover 3 and the transmission mechanism 2 when the cover 3 of FIG. 1A is located at the closed position. FIG. 1C is a schematic diagram of the HUD 100 showing the connection relation between the screen assembly 5 and the transmission mechanism 2 when the cover 3 of FIG. 1A is located at the closed position. In order to keep the drawings concise, FIG. 1B only shows parts of mechanisms for driving the cover 3, while FIG. 1C only shows parts of mechanisms for driving the screen assembly 5.

As shown in FIG. 1A, the HUD 100 includes a housing 1, a transmission mechanism 2, a cover 3, a drive mechanism 4 and a screen assembly 5. The transmission mechanism 2, the drive mechanism 4 and the screen assembly 5 are accommodated in the housing 1. The drive mechanism 4 is connected to the transmission mechanism 2 for driving the transmission mechanism 2. The cover 3 and the screen assembly 5 are connected to the transmission mechanism 2, and movable relative to the housing 1 through the transmission mechanism 2. In addition, the cover 3 has an opening H. The screen 50 of the screen assembly 5 may stick out from the housing 1 through the opening H.

Figure 4:
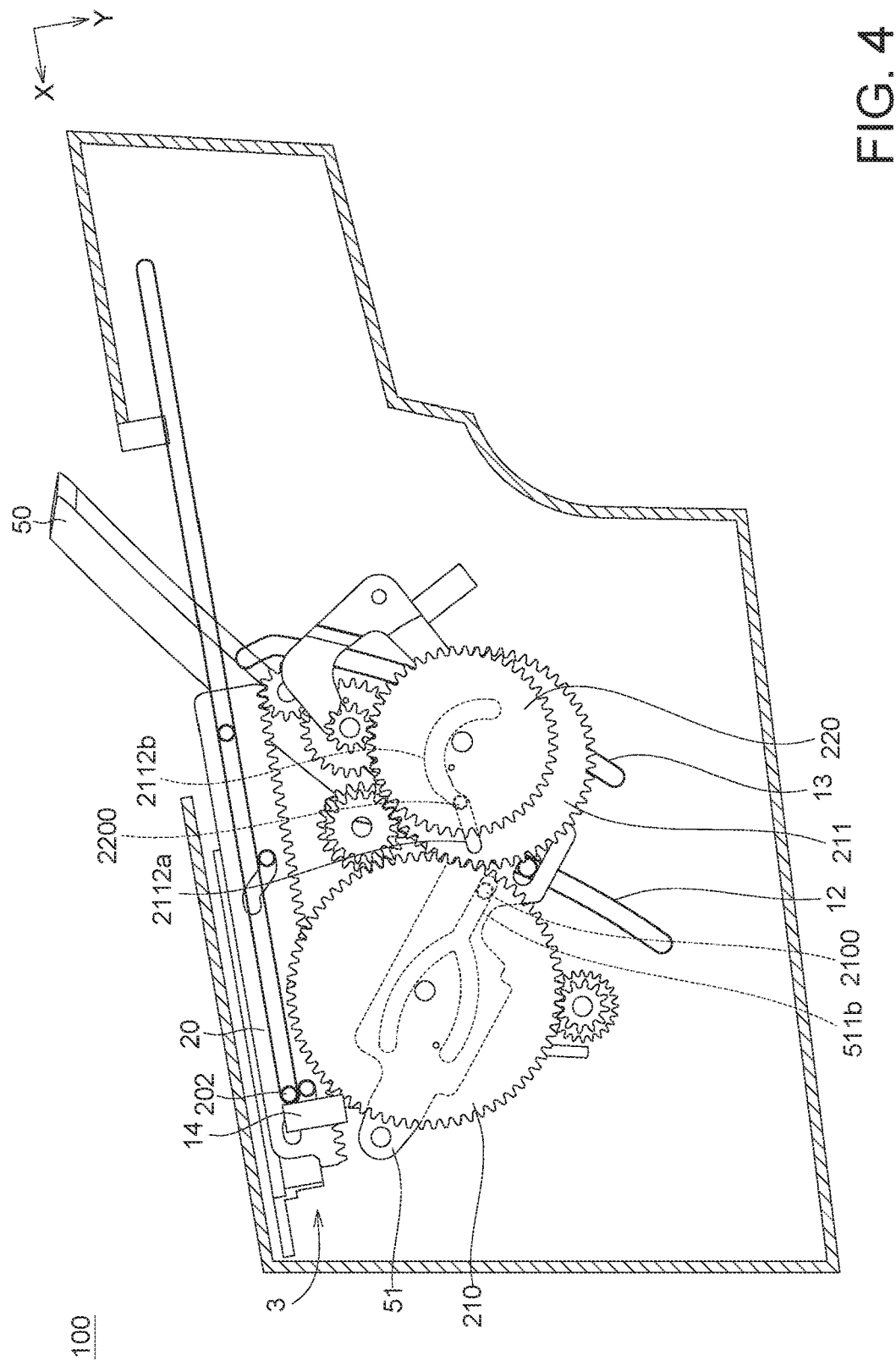
FIG. 4 is a schematic diagram of the HUD showing a state where the cover of FIG. 3 is located at the opened position and the screen moves from the storage position towards the display position.

From the above, the opening H of the cover 3 may vertically penetrate through the outer surface 1a and the inner surface 1b of the housing 1. When the cover 3 is located at the closed position (as shown in FIGS. 1A and 1B), the cover 3 hides the opening H, and the cover 3 may be flush with the outer surface 1a. The cover 3 may be movable between the closed position and the opened position (as shown in FIG. 4) by the transmission mechanism 2. Specifically, referring to FIGS. 1A and 1B, the drive mechanism 4 includes a drive source 40 (such as a motor) and a drive gear 41 driven by the drive source 40. The drive gear 41 is connected to the transmission mechanism 2 for driving the transmission mechanism 2 so as to drive the cover 3 to move. For example, the drive source 40 may drive the drive gear 41 to rotate in a first direction D1 so as to drive the cover 3 to move from the closed position to the opened position.

Figure 2:
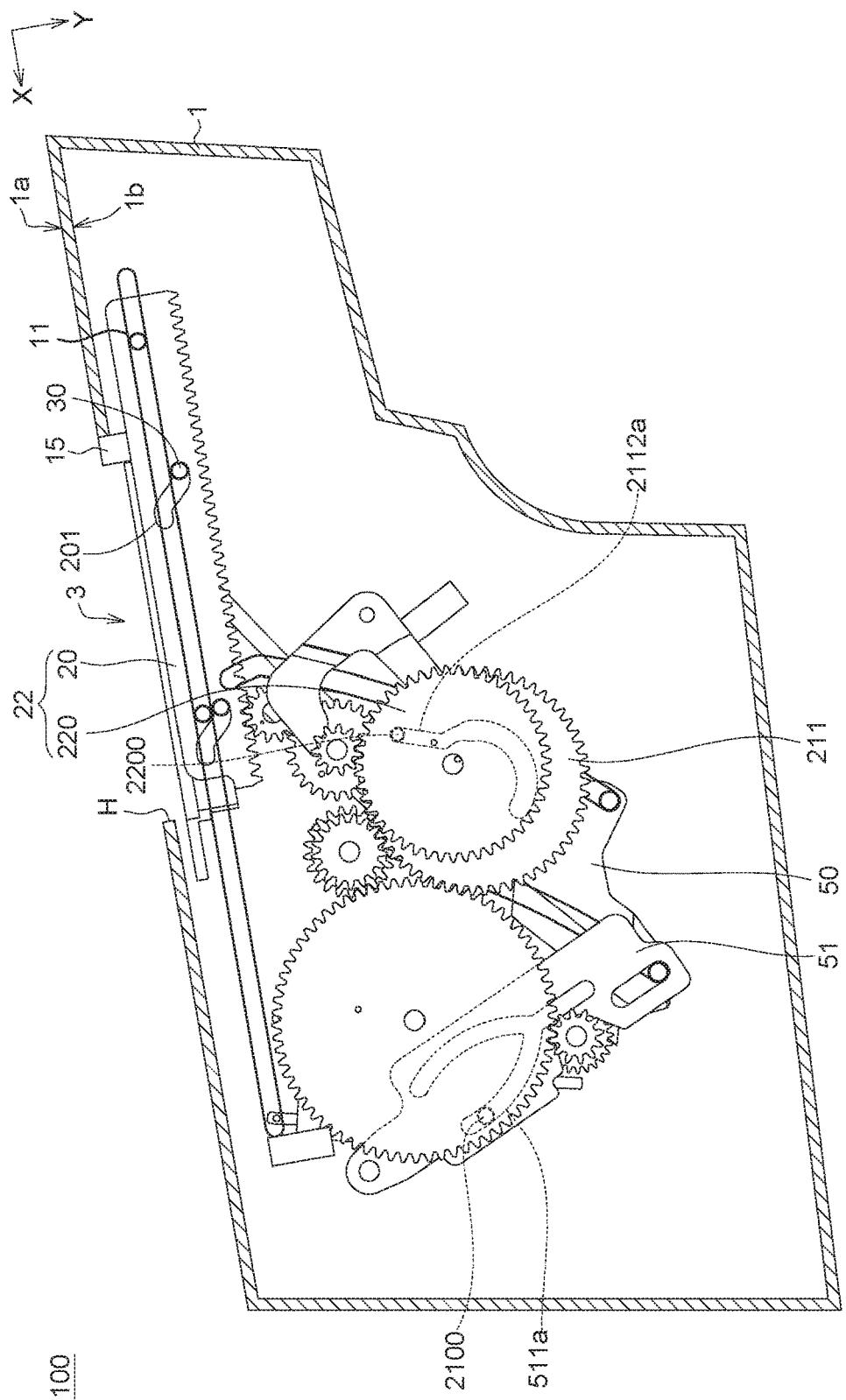
FIG. 2 is a schematic diagram of the HUD showing a state where the cover of FIG. 1A is located at the intermediate position.
Figure 3:
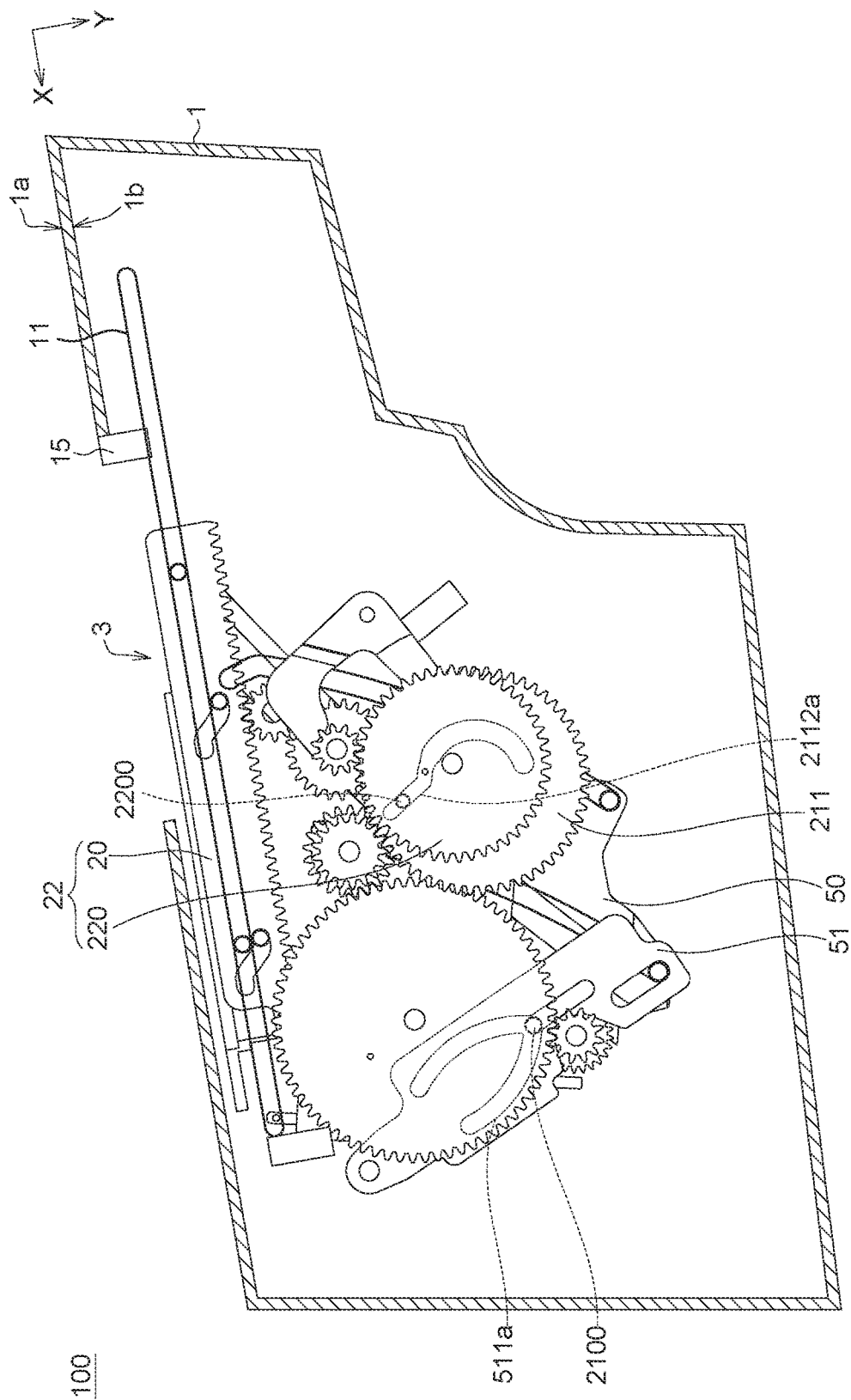
FIG. 3 is a schematic diagram of the HUD showing a process where the cover moves from the intermediate position shown in FIG. 2 towards the opened position.

FIG. 2 is a schematic diagram of the HUD 100 showing a state where the cover 3 of FIG. 1A is located at the intermediate position. FIG. 3 is a schematic diagram of the HUD 100 showing a process where the cover 3 moves from the intermediate position shown in FIG. 2 towards the opened position. FIG. 4 is a schematic diagram of the HUD 100 showing a state where the cover 3 of FIG. 3 is located at the opened position and the screen 50 moves from the storage position towards the display position.

Referring to FIGS. 1B, 2, 3 and 4, during a process where the cover 3 moves from the closed position shown in FIG. 1B to the opened position shown in FIG. 4, the cover 3 is located at the intermediate position shown in FIG. 2 at first, and then moves to the opened position shown in FIG. 4. That is, the cover 3 is retracted away from the edge of the opening H at first, and then moves to the opened position. During a process where the cover 3 moves from the closed position to the intermediate position, the cover 3 moves to the underside of the opening H in a vertical way, for example, the cover 3 moves along a Y-axis direction. During a process where the cover 3 moves from the intermediate position to the opened position, the cover 3 moves from the underside of the opening H to be away from the opening H within the housing 1, for example, the cover 3 moves away from the opening H along a X-axis direction. Conversely, during a process where the cover 3 moves from the opened position to the closed position, the cover 3 moves towards the opening H along a negative X-axis direction to the underside of the opening H at first, and then vertically moves along a negative Y-axis direction to be flush with the outer surface 1a and hide the opening H. Since the cover 3 is raised and lowered along the edge of the opening H, the cover 3 may reliably hide the opening H, thereby improving the fitness for the cover 3 to be closed. A further description is provided below.

In one embodiment, the transmission mechanism 2 may include a gear rack 20 movably disposed in the housing 1. Specifically, the housing 1 may have a slide rail 11. The gear rack 20 may move relative to the housing 1 through a relative sliding movement between a slide pin 202 of the gear rack 20 and the slide rail 11. Furthermore, the gear rack 20 has a guide rail 201, and the cover 3 includes a guide pin 30 slidably disposed in the guide rail 201. When the drive mechanism 4 drives the gear rack 20 to move along the slide rail 11, the gear rack 20 drives the cover 3 to move through a connection between the guide rail 201 of the gear rack 20 and the guide pin 30. Through the guide of the gear rack 20, the accuracy for positioning the cover 3 during movement may be increased.

In detail, referring to FIGS. 1B, 2, 3 and 4, the guide rail 201 may specifically be in the form of a Z shape, and includes a first parallel section 201a, a second parallel section 201b and an inclined section 201c. The first parallel section 201a and the second parallel section 201b are respectively located at a first end 201e1 and a second end 201e2 opposite to the first end 201e1 of the guide rail 201. The inclined section 201c is connected between the first parallel section 201a and the second parallel section 201b. As shown in FIG. 1B, when the cover 3 is located at the closed position, the guide pin 30 is located within the first parallel section 201a which is at a higher level, i.e., the guide pin 30 is located at the first end 201e1 of the guide rail 201. As shown in FIGS. 1B and 2, during a process where the cover 3 moves from the closed position to the intermediate position, since the gear rack 20 moves along the X-axis direction, the guide pin 30 is moved, by the gear rack 20, to the second parallel section 201b which is at a lower level via the inclined section 201c, i.e., the guide pin 30 is moved to the second end 201e2 of the guide rail 201. In addition, through the inclined section 201c, the cover 3 may vertically moves along the Y-axis direction to the underside of the opening H so that the whole cover 3 is under the inner surface 1b of the housing 1. As shown in FIGS. 1B, 2, 3 and 4, during a process where the cover 3 moves from the intermediate position to the opened position, the guide pin 30 stays at the second end 201e2 of the guide rail 201, i.e., the guide pin 30 stays within the second parallel section 201b. In this process, the cover 3 is moved to the opened position through a movement of the gear rack 20 relative to the housing 1. For example, the housing 1 may further include a stopper portion 14 for stopping the opened cover. When the slide pin 202 of the gear rack 20 touches the stopper portion 14, the gear rack 20 stops moving, leading the cover 3 to stay at the opened position.

In one embodiment, two guide rails 201 of the gear rack 20 may not necessarily be in the form of a Z shape. One of the guide rails 201 may be in the form of a Z shape, while the other one of the guide rails 201 may be a horizontal guide rail. The Z-shaped guide rail and the horizontal guide rail may respectively be located at two ends of the gear rack 20.

In one embodiment, the HUD 100 may further include a first elastic element (not shown). The first elastic element may be disposed on the housing 1. When the slide pin 202 of the gear rack 20 touches the stopper portion 14, the slide pin 202 is restricted between the stopper portion 14 and the first elastic element. That is, the left and right sides of the slide pin 202 are respectively restricted by the stopper portion 14 and the first elastic element. Thus, the gear rack 20 cannot move and the cover 3 stays at the opened position.

In one embodiment, the HUD 100 may further include a second elastic element (not shown). The second elastic element is connected between the cover 3 and the gear rack 20. In addition, the second elastic element provides the cover 3 with elastic force so that the guide pin 30 tends to abut against the second end 201e2 of the guide rail 201. Through the second elastic element, during a process where the cover 3 moves from the intermediate position to the opened position, the guide pin 30 of the cover 3 keeps staying at the second end 201e2 of the guide rail 201 so that the cover 3 can be reliably moved by the gear rack 20 in this process. Furthermore, the housing 1 may further include a stopper portion 15 for stopping the closed cover 3. When the cover 3 is located at the closed position, the stopper portion 15 may stop the guide pin 30 of the cover 3 tending to abut against the second end 201e2 of the guide rail 201 due to the second elastic element. Thus, the guide pin 30 keeps staying at the first end 201e1 of the guide rail 201.

In particular, through the first parallel section 201a and the second parallel section 201b mentioned above, in a condition that the guide pin 30 is located within the first parallel section 201a or the second parallel section 201b, even though the cover 3 is pressed by an external force, the pressing force will not be transmitted to the underneath transmission mechanism 2. Thus, it may prevent the transmission mechanism 2 from broken by the external force, but the present disclosure is not limited thereto.

As shown in FIGS. 2 and 3, in the present embodiment, the slide rail 11 is a rectilinear rail that extends along the X-axis direction. Thus, during a process where the cover 3 moves from the intermediate position to the opened position, the cover 3 moves away from the opening H along the X-axis direction. However, the slide rail 11 of the present disclosure is not limited to the rectilinear rail.

On the other hand, during a process where the cover 3 moves from the closed position to the opened position, the screen 50 of the screen assembly 5 may be driven by the transmission mechanism 2 to stick out from the housing 1 through the opening H. In one embodiment, the movement and power switch between the cover 3 and the screen assembly 5 may be realized by the structural design of the transmission mechanism 2. A further description is exemplified below.

Referring to FIGS. 1A, 1B and 1C, the transmission mechanism 2 may include a first transmission assembly 21 and a second transmission assembly 22 that are connected to each other. The first transmission assembly 21 is driven by the drive gear 41, and the second transmission assembly 22 is driven by the first transmission assembly 21. The cover 3 is connected to the second transmission assembly 22 and driven to move by the second transmission assembly 22.

Figure 6:
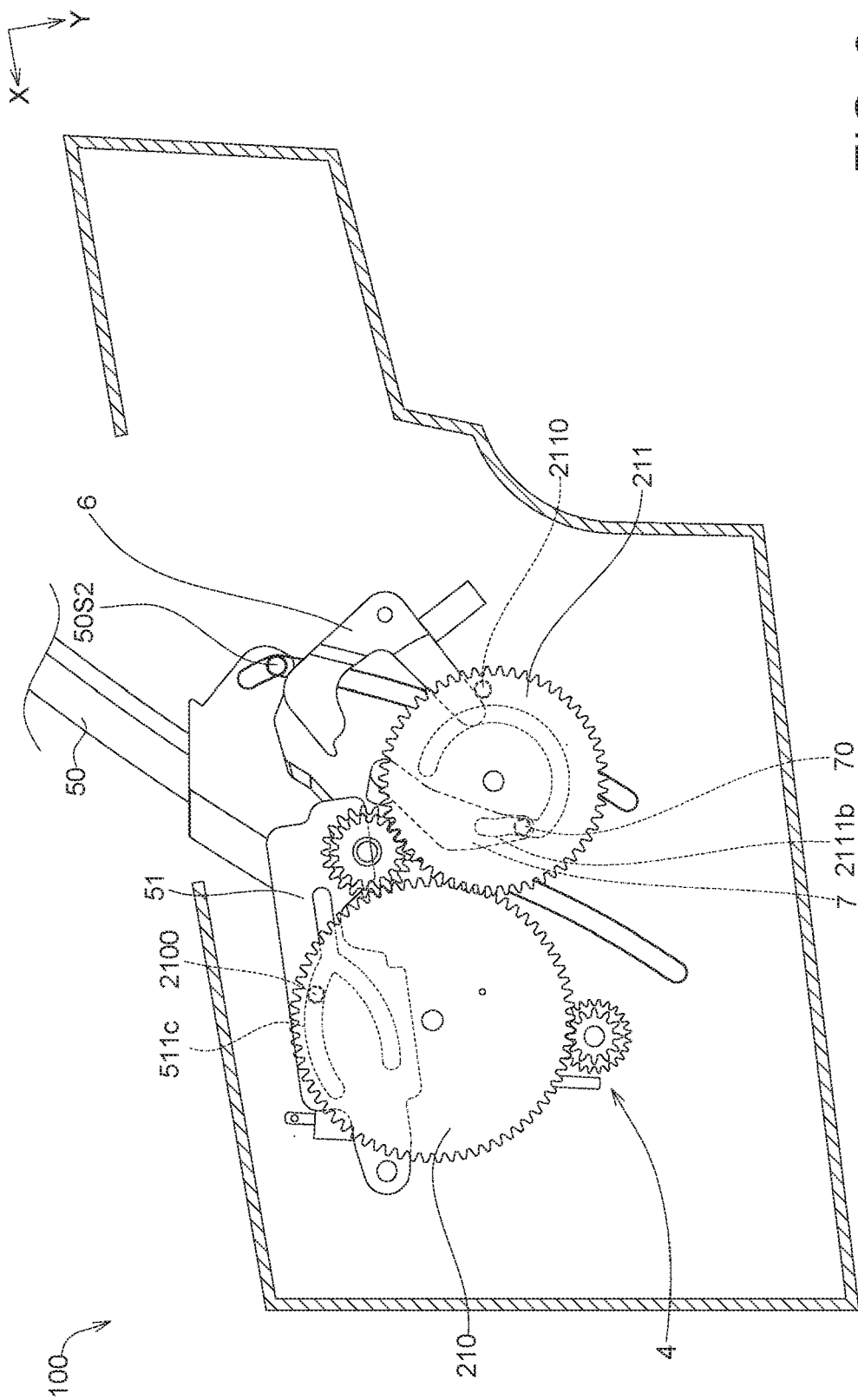
FIG. 6 is a schematic diagram of the HUD showing a state where the screen of FIG. 5 is located at the display position.

The screen assembly 5 may include a screen 50 and a rocker lever 51. The screen 50 includes a first shaft 50S1 and a second shaft 50S2. The first shaft 50S1 is connected to a connection portion 510 of the rocker lever 51. The connection portion 510 may have, for example, a slide groove (not designated). The first shaft 50S1 is movably disposed in the slide groove. The rocker lever 51 is connected to the first transmission assembly 21 and driven by the first transmission assembly 21, so that the screen 50 is driven to move between the storage position (as shown in FIG. 1C) and the display position (as shown in FIG. 6). Furthermore, the first shaft 50S1 of the screen 50 is slidably disposed in a first arc groove 12 of the housing 1, and the second shaft 50S2 of the screen 50 is slidably disposed in a second arc groove 13 of the housing 1. Thus, the position of the screen 50 may be confined during movement. However, the present disclosure is not limited thereto.

The first transmission assembly 21 may include a first transmission element 210 and a transmission switching element 211. The first transmission element 210 is connected to (or engaged with) the drive gear 41 of the drive mechanism 4, and is driven by the drive mechanism 4. The transmission switching element 211 may be connected to the first transmission element 210 via a gear assembly 212. Thus, the transmission switching element 211 may be indirectly driven by the first transmission element 210. The second transmission assembly 22 may include a second transmission element 220. The second transmission element 220 is connected to the transmission switching element 211, and may be driven by the transmission switching element 211.

As shown in FIG. 1B, the cover 3 is connected to the second transmission assembly 22, and driven to move by the second transmission assembly 22. Referring to FIG. 1C, the screen assembly 5 is connected to the first transmission assembly 21, and driven to move by the first transmission assembly 21. More specifically, the power source for driving the cover 3 and the screen assembly 5 to move may be divided into two paths. One of the paths is formed to drive the cover 3 to move via the first transmission assembly 21 and the second transmission assembly 22. The other one of the paths is formed to drive the screen assembly 5 to move via the first transmission assembly 21. The power switch between the two paths is controlled by the structure of the transmission switching element 211.

Specifically, as shown in FIG. 1B, a second guide groove 2112 may be provided on the second surface 211b of the transmission switching element 211. The second guide groove 2112 has a rectilinear section 2112a and an arc section 2112b that are connected to each other. The center of curvature of the arc section 2112b is substantially the rotational center of the transmission switching element 211. The second transmission element 220 may include a second guide portion 2200. The second guide portion 2200 is provided on a surface of the second transmission element 220 facing the transmission switching element 211. The second guide portion 2200 is slidably disposed in the second guide groove 2112.

Referring to FIGS. 1B, 2, 3 and 4, during a process where the cover 3 moves from the closed position as shown in FIG. 1B to the opened position as shown in FIG. 4, the second guide portion 2200 slides in the rectilinear section 2112a, and drives the second transmission element 220 to rotate through the guide of the rectilinear section 2112a. In the period of time, since the second guide portion 2200 is located within the rectilinear section 2112a, the second transmission element 220 rotates together with the transmission switching element 211, leading to no relative movement between the second transmission element 220 and the transmission switching element 211. As a result, during this process, power may be transmitted to the cover 3 via the second transmission assembly 22 so as to drive the cover 3 to move from the closed position to the opened position.

Afterwards, as shown in FIG. 4, when the cover 3 is located at the opened position, the second guide portion 2200 is going to enter the arc section 2112b. In a condition that the second guide portion 2200 enters the arc section 2112b and slides in the arc section 2112b, even though the transmission switching element 211 continues to rotate, the transmission switching element 211 cannot drive the second transmission element 220 to rotate since the center of curvature of the arc section 2112b is substantially the rotational center of the transmission switching element 211. In other words, through the guide of the arc section 2112b, the second transmission element 220 stops rotating. As a result, after the cover 3 is located at the opened position, the second transmission element 220 stops rotating, so as to block the path where the power is transmitted to the cover 3. On the other hand, the first transmission assembly 21 still continues to rotate through the drive of the drive mechanism 4. Therefore, the path where the power is transmitted to the screen assembly 5 is not blocked. The screen assembly 5 may be driven to move by the first transmission assembly 21.

Referring to FIGS. 1C, 2, 3 and 4, the rocker lever 51 of the screen assembly 5 is connected to the first transmission element 210 and driven to move by the first transmission element 210. For example, the rocker lever 51 may have a guide slot 511, and the first transmission element 210 includes a first guide portion 2100 slidably disposed in the guide slot 511. When the drive mechanism 4 drives the first transmission element 210, the first transmission element 210 drives the rocker lever 51 through a connection between the first guide portion 2100 and the guide slot 511, and the rocker lever 51 drives the screen 50 to move from the storage position towards the display position through a connection between the connection portion 510 and the first shaft 50S1.

For example, as shown in FIG. 1C, the guide slot 511 may have a first arc section 511a and a rectilinear section 511b that are connected to each other. When the rocker lever 51 is disposed at the position as shown in FIG. 10, the center of curvature of the first arc section 511a substantially corresponds to the rotational center of the first transmission element 210. At the time when the first transmission element 210 is driven by the drive mechanism 4 so that the first guide portion 2100 slides in the first arc section 511a, the first transmission element 210 cannot drive the rocker lever 51 to rotate. As a result, as shown in FIGS. 1C, 2 and 3, the screen 50 does not move in the period of time, thus staying at the storage position.

Afterwards, as shown in FIG. 4, during a process where the cover 3 moves from the intermediate position to the opened position, the first guide portion 2100 slides in the rectilinear section 511b. Thus the rocker lever 51 is driven to rotate by the guide of the rectilinear section 511b in which the first guide portion 2100 slides, thereby driving the screen 50 to move towards the display position. In the period of time, since the first guide portion 2100 is located within the rectilinear section 511b, the rocker lever 51 rotates together with the first transmission element 210, leading to no relative movement between the rocker lever 51 and the first transmission element 210. As a result, the screen 50 is driven to move towards the display position.

However, the shape of the guide slot 511 of the rocker lever 51 mentioned above is exemplified for a purpose of explanation. The shape of the guide slot 511 may be modified based on the different requirements of design.

Figure 5:
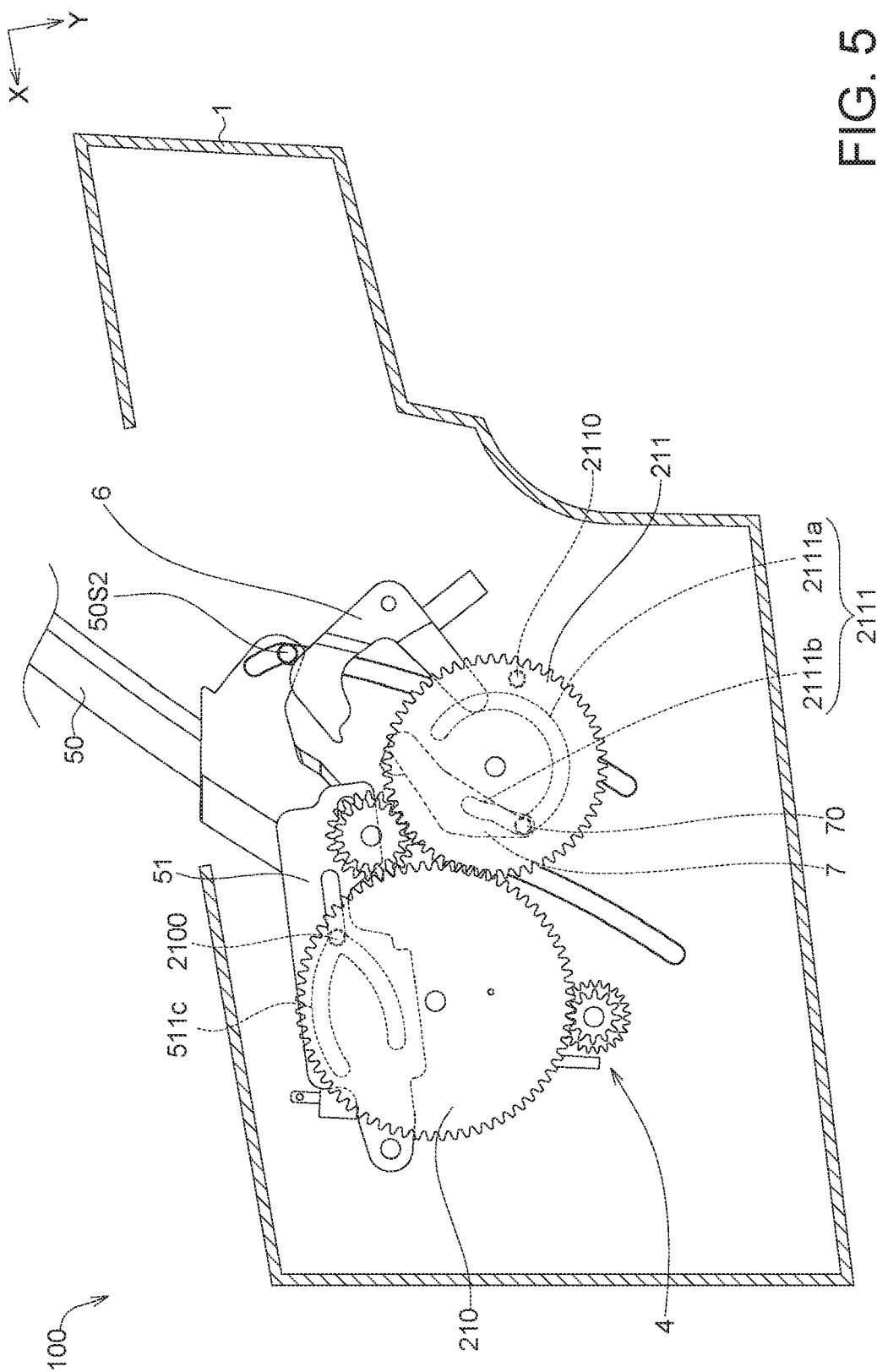
FIG. 5 is a schematic diagram of the HUD showing a state where the screen of FIG. 4 moves towards the display position.
Figure 7:
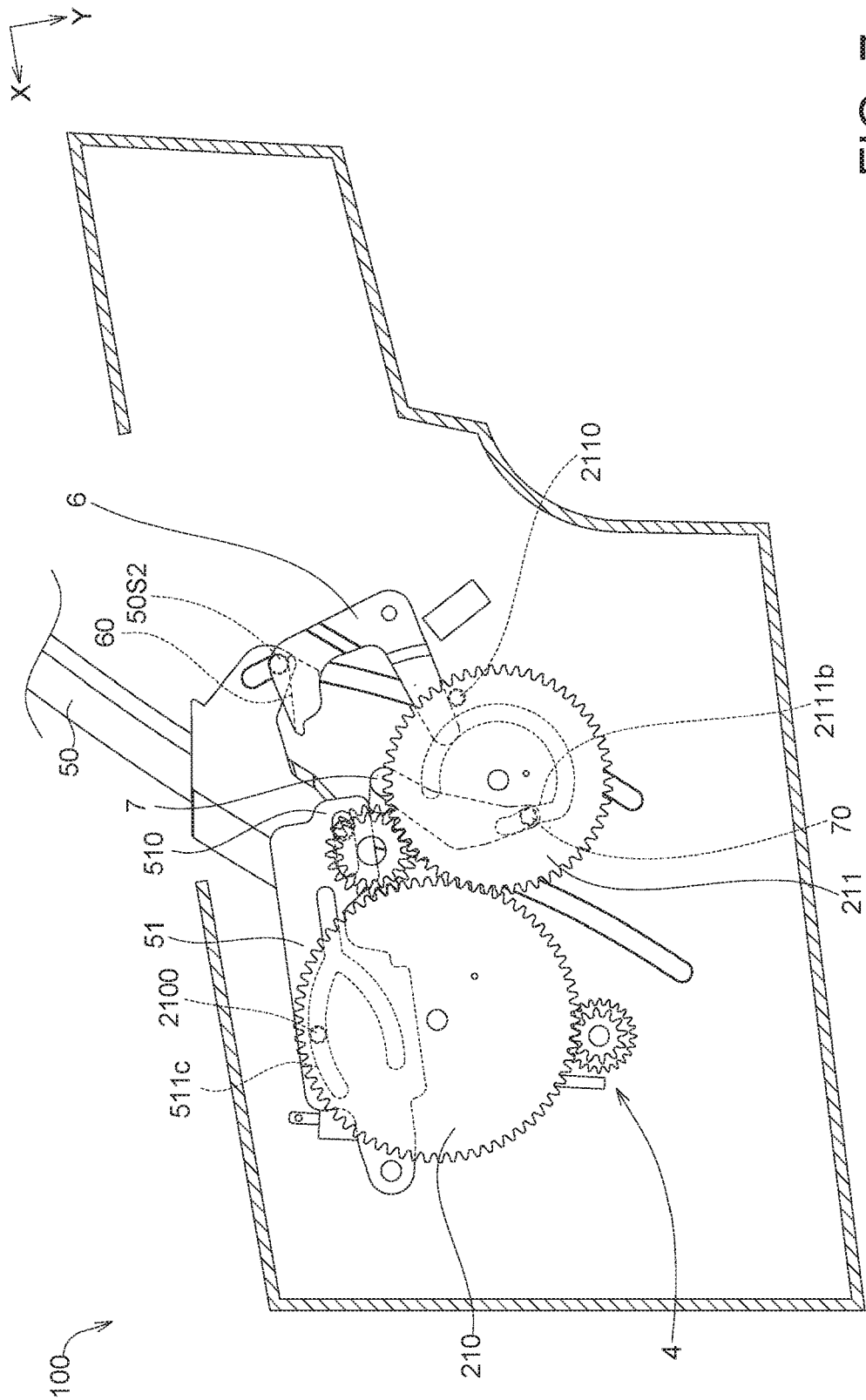
FIG. 7 is a schematic diagram of the HUD showing a state where the oblique angle of the screen of FIG. 6 is going to be adjusted.
Figure 8:
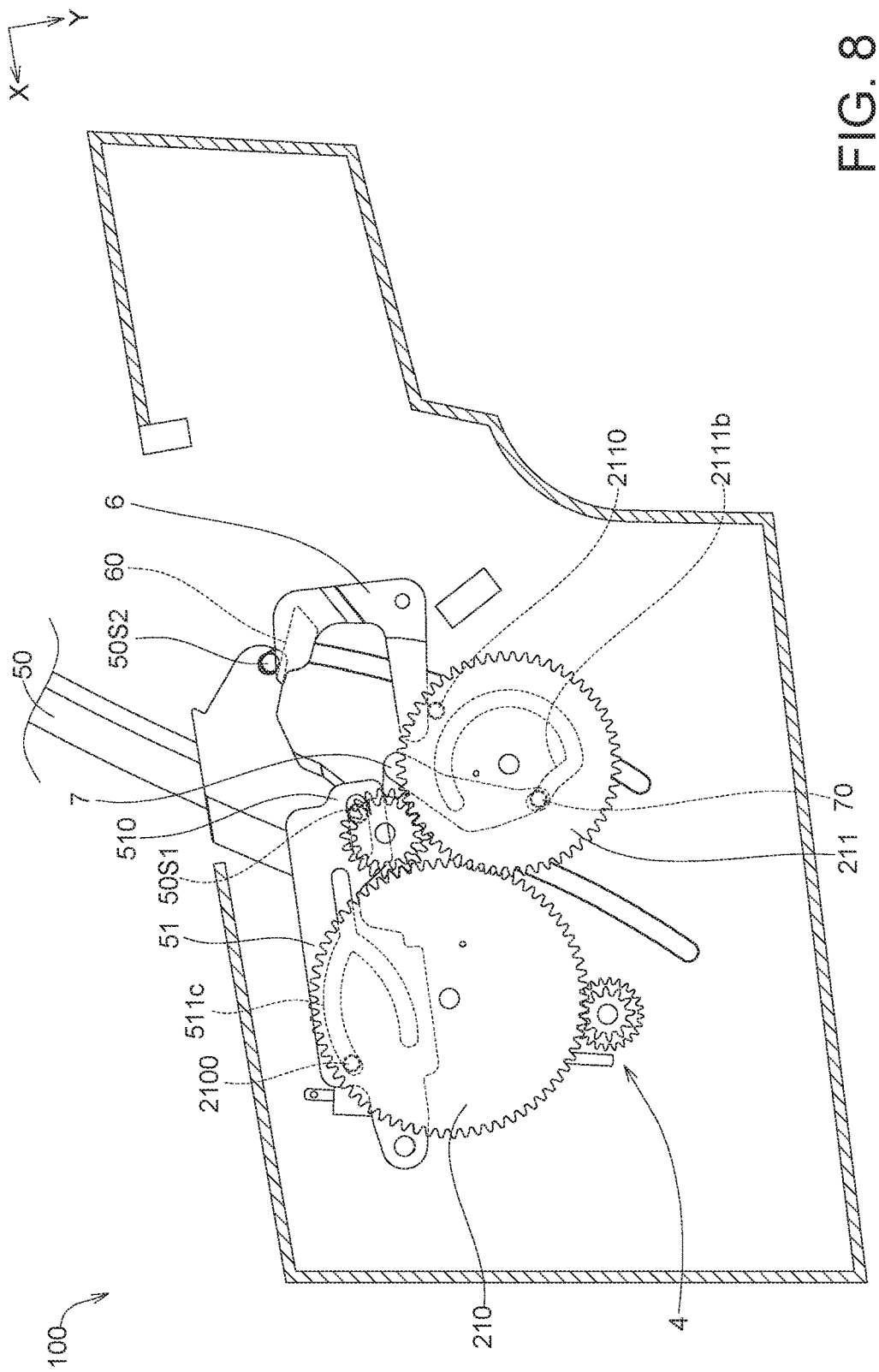
FIG. 8 is a schematic diagram of the HUD showing the adjustment for oblique angle of the screen of FIG. 7 is finished.

FIG. 5 is a schematic diagram of the HUD 100 showing a state where the screen 50 of FIG. 4 moves towards the display position. FIG. 6 is a schematic diagram of the HUD 100 showing a state where the screen 50 of FIG. 5 is located at the display position. FIG. 7 is a schematic diagram of the HUD 100 showing a state where the oblique angle of the screen 50 of FIG. 6 is going to be adjusted. FIG. 8 is a schematic diagram of the HUD 100 showing the adjustment for oblique angle of the screen 50 of FIG. 7 is finished. Since the cover 3 stops moving after moving to the opened position as shown in FIG. 4, to keep the drawings concise, FIGS. 5-8 have no illustration for parts of mechanisms for driving the cover 3 and the gear rack 20.

Referring to FIGS. 1C and 5, the HUD 100 may further include a rotary arm 6 rotatably disposed in the housing 1. In addition, the rotary arm 6 may be driven to rotate by the first transmission assembly 21.

Specifically, as shown in FIG. 1C, a pushing protrusion 2110 may be provided on a first surface 211a of the transmission switching element 211 of the first transmission assembly 21. The pushing protrusion 2110 is adapted for pushing the rotary arm 6 to rotate. The first surface 211a is a surface invisible from the viewing angle of FIG. 1C and opposite to the second surface 211b shown in FIG. 1B. Referring to FIGS. 1C, 5, 6, 7 and 8, when the screen 50 moves from the storage position to the display position as shown in FIG. 6, the pushing protrusion 2110 pushes one end of the rotary arm 6 to rotate, and the other end of the rotary arm 6 is driven to push the second shaft 50S2 of the screen 50 so as to adjust the oblique angle of the screen 50. Furthermore, a slant surface 60 (shown in FIGS. 7 and 8) may be provided on the other end of the rotary arm 6. When the screen 50 is located at the display position, as shown in FIGS. 6, 7 and 8, the rotary arm 6 pushes the second shaft 50S2 of the screen 50 with the slant surface 60 so as to finely adjust the oblique angle of the screen 50.

As described above, the oblique angle of the screen 50 may be adjusted to an angle suitable for the user to watch. During the adjustment for oblique angle of the screen 50, to take the resolution of the screen 50 into account, the degree to adjust the oblique angle of the screen 50 cannot be excessively large. In the present embodiment, since the rotary arm 6 is driven by the power source of the drive mechanism 4 transmitted via the first transmission assembly 21, designer may adjust the reduction ratio between the first transmission assembly 21 and the drive mechanism 4 to finely adjust the oblique angle of the screen 50. That is, even if the drive source 40 of the drive mechanism 4 revolves one step angle, the oblique angle of the screen 50 may be finely varied through the rotary arm 6 and the slant surface 60. Therefore, the adjustment for the oblique angle may be precise and fine, and it is possible to advance the oblique angle to a plurality of precise angles. For example, in one embodiment, the oblique angle of the screen 50 may be adjusted in a range of ±5 degrees.

Furthermore, as shown in FIG. 8, after the adjustment for oblique angle of the screen 50 is finished, the screen 50 is raised to the highest level, and the second shaft 50S2 of the screen 50 is firmly hold by the slant surface 60 of the rotary arm 6. At this moment, even if an external force presses the screen 50, the screen 50 may be supported by the rotary arm 6, thereby enhancing the strength of the structure.

Moreover, in one embodiment, the HUD 100 may further include a third elastic element (not shown). The third elastic element provides the second shaft 50S2 of the screen 50 with elastic force so that the second shaft 50S2 tends to abut against the slant surface 60 of the rotary arm 6. Through the third elastic element, a reliable connection may be formed between the second shaft 50S2 and the slant surface 60 so that the structure may be more stable.

On the other hand, referring to FIGS. 1C and 5, the HUD 100 may further include a locking structure 7. The locking structure 7 is rotatably disposed in the housing 1, and may be driven to rotate by the first transmission assembly 21.

Specifically, as shown in FIG. 1C, a first guide groove 2111 may be provided on the first surface 211a of the transmission switching element 211 of the first transmission assembly 21. The locking structure 7 may include a guide protrusion 70 slidably disposed in the first guide groove 2111. Further, the first guide groove 2111 has an arc section 2111a and a rotating section 2111b. The center of curvature of the arc section 2111a is substantially the rotational center of the transmission switching element 211, while the rotating section 2111b may substantially be linear.

Referring to FIGS. 1C, 5, 6, 7 and 8, when the screen 50 is located at the storage position as shown in FIG. 1C, the guide protrusion 70 is located within the arc section 2111a. During a process where the screen 50 moves from the storage position as shown in FIG. 1C to a position as shown in FIG. 5, the guide protrusion 70 slides in the arc section 2111a. In the period of time, even though the transmission switching element 211 continues to rotate, the transmission switching element 211 cannot drive the locking structure 7 to rotate since the center of curvature of the arc section 2111a is substantially the rotational center of the transmission switching element 211. However, once the guide protrusion 70 enters the rotating section 2111b and slides in the rotating section 2111b, the transmission switching element 211 drives the locking structure 7 to rotate through a connection between the rotating section 2111b and the guide protrusion 70. In addition, as shown in FIGS. 5, 6, 7 and 8, the locking structure 7 rotates and abuts against the connection portion 510 so as to hold the first shaft 50S1 of the screen 50.

Since the HUD 100 is generally embedded in a vehicle, in a condition that the screen 50 sticks out through the opening H, the screen 50 may usually be shaken as the vehicle moves. In the present embodiment, the locking structure 7 may firmly hold the first shaft 50S1 of the screen 50, thereby preventing the screen 50 from shaking. Also from the above description, since the second shaft 50S2 of the screen 50 is supported by the rotary arm 6, it may further prevent the screen 50 from shaking.

On the other hand, referring to FIGS. 1C, 5, 6, 7 and 8, the guide slot 511 of the rocker lever 51 may further have a second arc section 511c. The first arc section 511a, the rectilinear section 511b and the second arc section 511c intersect at one point. That is, the guide slot 511 may be substantially in the form of a Y shape. When the rocker lever 51 is disposed at the position as shown in FIGS. 5, 6, 7 and 8, the center of curvature of the second arc section 511c of the rocker lever 51 substantially corresponds to the rotational center of the first transmission element 210. At the time when the first transmission element 210 is driven by the drive mechanism 4 so that the first guide portion 2100 slides in the second arc section 511c, the first transmission element 210 cannot drive the rocker lever 51 to rotate. As a result, as shown in FIGS. 5, 6, 7 and 8, the screen 50 cannot be driven to move by the rocker lever 51 in the period of time. However, since the first transmission assembly 21 continues to rotate, the rotary arm 6 and the locking structure 7 may still be driven to rotate by the transmission switching element 211 to complete the fine adjustment for oblique angle of the screen 50 and to support the first shaft 50S1 and the second shaft 50S2 of the screen 50.

Inversely, if there is no need to use the screen 50, the drive source 40 may drive the drive gear 41 to rotate reversely, for example, rotate in a second direction D2 (as shown in FIG. 1A). Thus, the screen 50 of the HUD 100 may go back to the storage position in a way sequentially as shown in FIGS. 8, 7, 6, 5, 4, 3, 2 and 1A, and the cover 3 goes back to the closed position. As shown in FIGS. 4, 3, 2 and 1B, during a process where the cover 3 moves from the opened position to the closed position, the cover 3 moves along the negative X-axis direction. Until the cover 3 touches the stopper portion 15, the cover 3 cannot move along the negative X-axis direction. Afterwards, the cover 3 moves vertically along the negative Y-axis direction to hide the opening H through the guide of the guide rail 201 of the gear rack 20.

As described above, the cover of the HUD in the present disclosure may move between the closed position and the opened position through the power source of the drive mechanism transmitted via the transmission mechanism. During a process where the cover moves from the closed position to the opened position, the cover vertically moves along the edge of the opening to the underside of the opening at first, and then moves from the underside of the opening to be away from the opening. Conversely, during a process where the cover moves from the opened position to the closed position, the cover moves towards the opening to the underside of the opening at first, and then the cover is raised up vertically along the edge of the opening to hide the opening. Since the cover is vertically raised and lowered along the edge of the opening, the cover may reliably hide the opening, thereby improving the fitness for the cover to be closed.

Furthermore, according to the HUD of embodiments in the present disclosure, the movement and power switch between the cover and the screen assembly may be realized by the structural design of the transmission mechanism. Thus, when the cover is located at the opened position, the path where the power is transmitted to the cover is blocked, while the path where the power is transmitted to the screen assembly is not blocked. Under such a design, it is possible to use one single drive source to drive the cover and the screen assembly. As a result, the power transmission may be transmitted reliably, and its stability may also be excellent.

Furthermore, according to embodiments in the present disclosure, the HUD may further include a rotary arm and a locking structure. The rotary arm and the locking structure may utilize the power-transmitting path for driving the screen assembly to rotate. In addition, through the rotary arm and the locking structure, it is possible to prevent the screen from shaking and leading to bad image quality. Further, through the rotary arm, it is possible to finely adjust the oblique angle of the screen.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A head up display comprising:
a housing having an opening;
a transmission mechanism disposed in the housing;
a cover connected to the transmission mechanism and movable between a closed position wherein the cover hides the opening and an opened position wherein the cover is located within the housing by the transmission mechanism; and
a drive mechanism configured to drive the transmission mechanism;
wherein while the cover moves from the closed position to the opened position, the cover moves to an intermediate position below the opening in a vertical way, and moves away from the intermediate position below the opening to the opened position in sequence,
wherein the transmission mechanism comprises a gear rack movably disposed in the housing and having a guide rail, the cover comprises a guide pin slidably disposed in the guide rail, and the drive mechanism is configured to drive the gear rack; and
wherein when the drive mechanism drives the gear rack, the cover is driven to move through a connection between the guide rail of the gear rack and the guide pin,
wherein the guide rail comprises a first parallel section, a second parallel section and an inclined section connecting the first parallel section and the second parallel section;
wherein when the cover is located at the closed position, the guide pin is located within the first parallel section; when the cover is located at the intermediate position and the opened position, the guide pin is located within the second parallel section.

2. The head up display according to claim 1, wherein the guide rail comprises a first end and a second end opposite to the first end; and
wherein when the cover is located at the closed position, the guide pin is located at the first end; when the cover is located at the intermediate position and the opened position, the guide pin is located at the second end.

3. A head up display comprising:
a housing having an opening;
a transmission mechanism disposed in the housing;
a cover connected to the transmission mechanism and movable between a closed position wherein the cover hides the opening and an opened position wherein the cover is located within the housing by the transmission mechanism;
a drive mechanism configured to drive the transmission mechanism; and a screen assembly comprising a screen and a rocker lever, the screen comprising a first shaft connected to a connection portion of the rocker lever and a second shaft;

wherein while the cover moves from the closed position to the opened position, the cover moves to an intermediate position below the opening in a vertical way, and moves away from the intermediate position below the opening to the opened position in sequence, wherein the transmission mechanism comprises a first transmission assembly and a second transmission assembly that are connected to each other, the first transmission assembly is configured to be driven by the drive mechanism, the second transmission assembly is configured to be driven by the first transmission assembly, and the cover is connected to the second transmission assembly and configured to be driven by the second transmission assembly, wherein the rocker lever is connected to the first transmission assembly, and configured to be driven by the first transmission assembly for driving the screen to move between a storage position and a display position.

4. The head up display according to claim 3, further comprising:

a rotary arm rotatably disposed in the housing;

wherein when the screen moves from the storage position to the display position, the rotary arm is driven to rotate by the first transmission assembly to push the second shaft of the screen so as to adjust an oblique angle of the screen.

5. The head up display according to claim 4, further comprising:

a locking structure rotatably disposed in the housing;

wherein when the screen moves from the storage position to the display position, the locking structure is driven to rotate by the first transmission assembly to abut against the connection portion so as to hold the first shaft of the screen.

6. The head up display according to claim 5, wherein the first transmission assembly comprises a first transmission element configured to be driven by the drive mechanism and a transmission switching element configured to be driven by the first transmission element;

wherein the rocker lever is connected to the first transmission element and configured to be driven by the first transmission element, and the rocker lever and the locking structure are configured to be driven to rotate by the transmission switching element.

7. The head up display according to claim 6, wherein the rocker lever comprises a guide slot, and the first transmission element comprises a first guide portion slidably disposed in the guide slot;

wherein when the drive mechanism drives the first transmission element, the first transmission element drives the rocker lever through a connection between the first guide portion and the guide slot, and the rocker lever drives the screen to move from the storage position towards the display position through a connection between the connection portion and the first shaft.

8. The head up display according to claim 6, wherein the transmission switching element comprises a pushing protrusion;

wherein when the screen moves from the storage position to the display position, the pushing protrusion pushes one end of the rotary arm to rotate, and the other end of the rotary arm is driven to push the second shaft so as to adjust the oblique angle of the screen.

9. The head up display according to claim 8, wherein a slant surface is provided on the other end of the rotary arm, and the rotary arm is configured to push the second shaft of the screen with the slant surface.

10. The head up display according to claim 8, wherein the transmission switching element has a first guide groove, the locking structure comprises a guide protrusion slidably disposed in the first guide groove;

wherein when the screen moves from the storage position to the display position, the transmission switching element drives the locking structure to rotate through a connection between the first guide groove and the guide protrusion, and the locking structure abuts against the connection portion so as to hold the first shaft.

11. The head up display according to claim 10, wherein the transmission switching element further has a second guide groove, the second guide groove having a rectilinear section and an arc section that are connected to each other;

the second transmission assembly comprises a second transmission element comprising a second guide portion slidably disposed in the second guide groove;

wherein while the cover moves from the closed position to the opened position, the second guide portion slides in the rectilinear section, and the second transmission element is driven to rotate through a connection between the second guide portion and the rectilinear section; when the cover is located at the opened position, the second guide portion slides in the arc section, and the second transmission element stops rotating through a connection between the second guide portion and the arc section.

12. The head up display according to claim 11, wherein the transmission switching element comprises a first surface and a second surface, the pushing protrusion and the first guide groove are disposed on the first surface, and the second guide groove is disposed on the second surface.

13. The head up display according to claim 3, wherein when the cover is located at the opened position, the second transmission assembly stops rotating, and the first transmission assembly continues to rotate.

14. The head up display according to claim 13, wherein the first transmission assembly comprises a transmission switching element having a second guide groove, the second guide groove having a rectilinear section and an arc section that are connected to each other; the second transmission assembly comprises a second transmission element comprising a second guide portion slidably disposed in the second guide groove;

wherein while the cover moves from the closed position to the opened position, the second guide portion slides in the rectilinear section, and the second transmission element is driven to rotate through a connection between the second guide portion and the rectilinear section; when the cover is located at the opened position, the second guide portion slides in the arc section, and the second transmission element stops rotating through a connection between the second guide portion and the arc section.

* * * * *